Aug. 23, 1966 A. Z. PURZYCKI 3,268,164

VARIABLE WIDTH TAPE GUIDE

Filed Dec. 28, 1964 2 Sheets-Sheet 1

INVENTOR
ALFRED Z. PURZYCKI

BY R. C. Terry
ATTORNEY

Aug. 23, 1966 A. Z. PURZYCKI 3,268,164

VARIABLE WIDTH TAPE GUIDE

Filed Dec. 28, 1964 2 Sheets-Sheet 2

United States Patent Office 3,268,164 Patented August 23, 1966

3,268,164
VARIABLE WIDTH TAPE GUIDE

Alfred Z. Purzycki, Mount Prospect, Ill., assignor to Teletype Corporation, Skokie, Ill., a corporation of Delaware Filed Dec. 28, 1964, Ser. No. 421,286
10 Claims. (Cl. 234—128)

This invention relates to variable width web guides and more particularly to web guides for guiding the various standard widths of telegraph tapes.

In the printing telegraph industry it has long been the practice to record messages by the use of permutation combinations of holes formed in paper webs or tapes. In the past these combinations have been five level, that is, they have been combinations of five holes or the absence thereof. Typically these combinations have been recorded in 11/16" wide paper tape and this has come to be the standard width for five levels recording. Recently it has become desirable to record more characters than is possible with five level recording and consequently combinations of six, seven and eight levels have been employed. The industry has come to use ⅞" wide webs for recording six and seven level combinations and to use 1" wide webs for recording eight level combinations. Tape preparation and utilization devices have been constructed which are capable of preparing and utilizing five, six, seven and eight level combinations depending on the information being recorded or utilized and accordingly it has become necessary to provide these devices with variable width web guides so that the various standard telegraph tapes may be oriented with respect to these devices. In the past these guides have either been comprised of a large number of complicated parts, therefore being very expensive, or have been difficult to operate.

Accordingly, it is an object of this invention to provide a simple, inexpensive variable width web guide which is easy to adjust to the various widths of webs to be guided.

Another object of this invention is to provide a variable width web guide which is simply constructed and which is comprised of a small number of parts.

A further object of this invention is to provide a variable width tape guides which accommodates the various widths of record tapes used in the telegraph industry.

According to the preferred embodiment of the invention a first web guide is provided which is slidably mounted in the frame of the device and which is spring urged into engagement with a first locating surface on the frame. A slidable guide support, which carries a second web guide, is slidably mounted on the frame and is latchable in three positions. When the slidable guide support is moved from one to the other of two of its positions it engages and drives a bell crank which in turn drives the first web guide out of engagement with the first locating surface and into engagement with a second locating surface on the frame. This causes the first and second web guides to be in different positions with respect to each other and with respect to the frame and thereby allows the device to guide webs of different widths.

The construction and operation of the invention may be more fully understood by having reference to the following detailed description when considered in conjunction with the accompanying drawings wherein.

Figure 1:
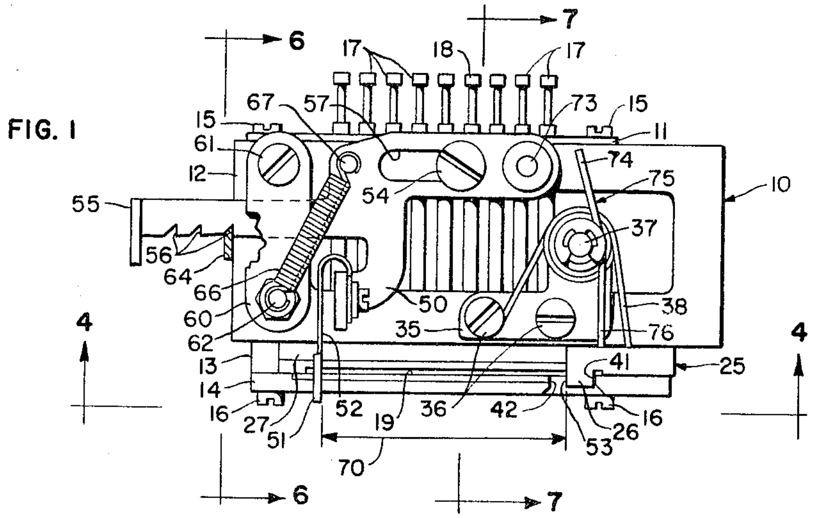
FIG. 1 is a front view of the variable width web guide of the present invention in which portions have been broken away to illustrate more clearly certain features of the structure and in which the device is in its widest web guiding position.
Figures 6, 7:
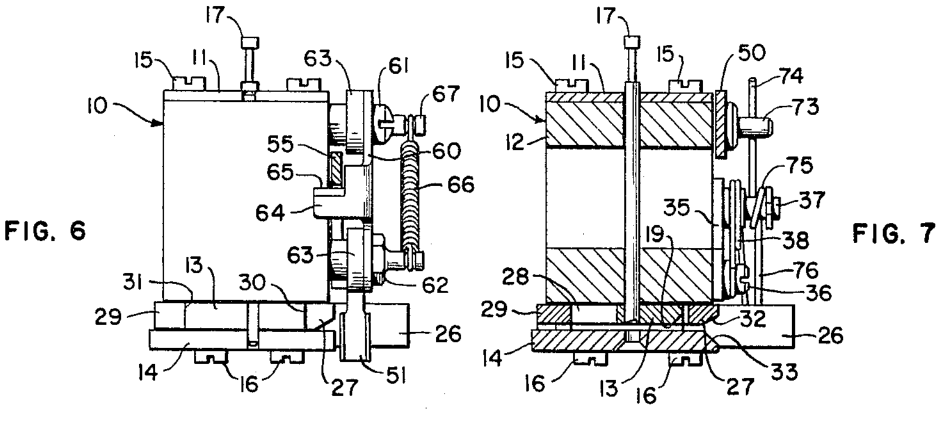
FIG. 6 is a sectional view taken substantially along the line 6—6 in FIG. 1 in the direction indicated by the arrows.
FIG. 7 is a sectional view taken substantially along the line 7—7 in FIG. 1 in the direction indicated by the arrows.

Referring now to the drawings wherein like figures are applied to like parts throughout the several views, with particular reference being had to FIGS. 1 and 7, there will be seen a punch block 10. This punch block is comprised of an upper guide plate 11, a frame 12, a lower guide plate 13 and a die plate 14. The upper guide plate 11 is secured to the frame 12 by means of fasteners 15 while the lower guide plate 13 and the die plate 14 are secured to the frame 12 by fasteners 16. Slidably mounted in the upper guide plate 11 and the lower guide plate 13 are a plurality of character punch pins 17 and a feed hole punch pin 18. All of these punch pins cooperate with the die plate 14 to form holes in a paper web or tape (not shown) which is inserted in the punch block through a slot 19 that is formed between the lower guide plate 13 and the die plate 14. The punch block 10 may be used in conjunction with, and the character punch pins 17 and the feed hole punch pin 18 may be driven by, any suitable punch pin driving mechanism which is capable of recording 5, 6, 7 and 8 level combinations according to the character of the information being recorded. Preferably, however, the punch pin driving mechanism is of the type described in United States Patent No. 3,056,546, granted to W. J. Zenner on October 2, 1962.

Figure 5:
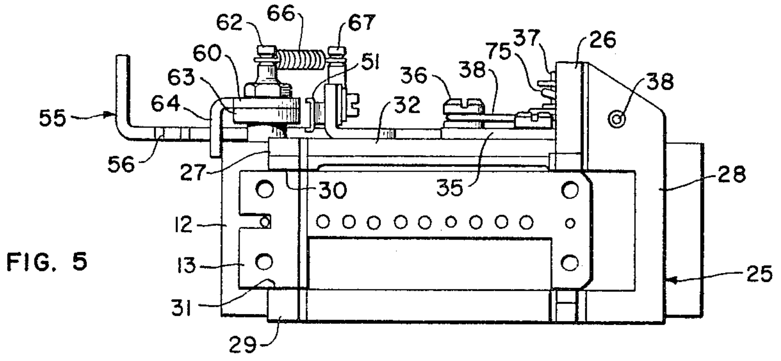
FIG. 5 is a bottom view of the device similar to FIG. 4 except that the die plate has been removed to more clearly illustrate certain features of the invention.

The punch block 10 serves as a supporting frame for the present apparatus and in so doing provides supporting means and locating surfaces for the various parts and subassemblies of the device. In particular, a first guide member 25, which is used to guide one edge of a paper web or tape which is to be perforated with code combinations of holes by the punch pin driving device, is slidably mounted between frame 12 and the die plate 14. As is best seen in FIGS. 1 and 5 the first guide member 25 which is of generally U-shaped configuration is comprised of an outwardly and downwardly extending arm 26, a forward guiding leg 27, a connecting portion 28 and a rearward guiding leg 29. The forward guiding leg, the rearward guiding leg and the connecting portion surround three sides of the lower guide plate 13 and serve to position the first guide member 25 by means of surfaces 30 and 31 which engage the sides of the leftward end (FIG. 5) of the lower guide plate 13. The forward guiding leg and the die plate 14 have beveled edges 32 and 33 (FIG. 7) formed in their front surfaces. These beveled edges aid operators in inserting webs in the slot 19.

Figure 4:
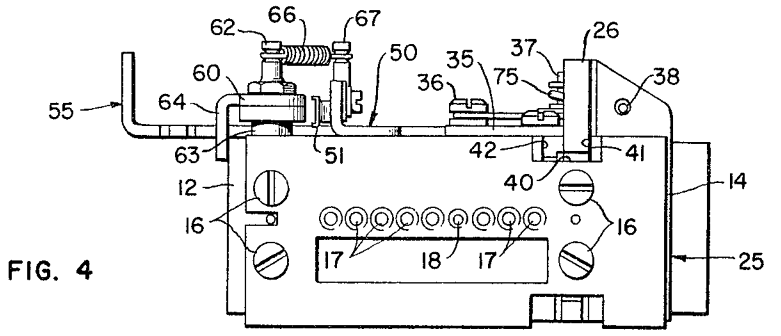
FIG. 4 is a bottom view of the device taken in the direction of the arrows along the line 4—4 in FIG. 1.

As is best seen in FIG. 1 there is mounted on the frame 12 of the punch block 10 an L-shaped bracket 35 which is attached to the frame 12 by means of a pair of fasteners 36. A finger 37 extends outwardly of the L-shaped bracket and serves to support on its rear portion a coil spring 38. Coil spring 38 is secured at one of its ends to one of the fasteners 36 and extends at the other of its ends into a hole 39 in the outwardly and downwardly extending leg 26 of the first guide member 25. As is best seen in FIG. 4 the die plate 14 has a slot 40 in its forward edge. The slot 40 has side edges 41 and 42 which serve as locating surfaces for the first guide member 25. Since the first guide member 25 is slidably mounted between the frame 12 of the punch block 10 and the die plate 14, the spring 38 serves to hold the first guide member against the edge 41 except when a force is applied to the first guide member 25 to move it against the edge 42.

Also slidably mounted on the frame 12 of the punch block 10 is a slidable guide support 50 which carries a second guide member 51. Second guide member 51 is supported on the slidable guide support 50 by means of inverted J-shaped spring 52 and since the second guide member 51 is spring supported it serves to positively drive a web located in the slot 19 into engagement with a guiding surface 53 on the first guide member 25. The surface 53, the second guide member 51 and the upper surface of the die plate 14 form a web guiding channel the width of which must be varied in order to guide the various widths of tapes which are employed in telegraphic recording.

Figure 2:
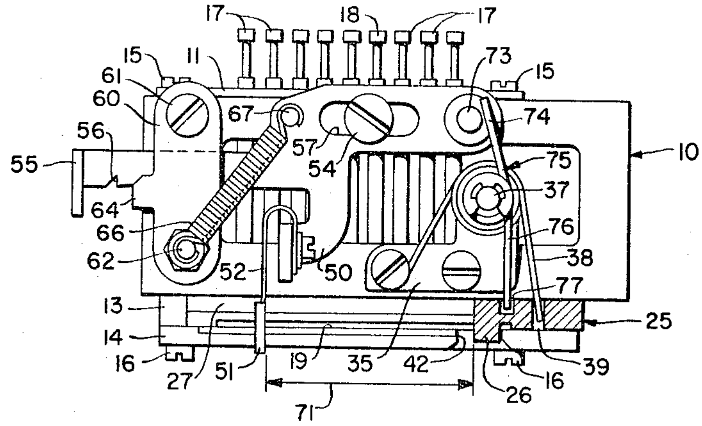
FIG. 2 is a front view of the device in which portions have been broken away to illustrate more clearly certain features of the invention and in which the device is shown in its intermediate web guiding position.
Figure 3:
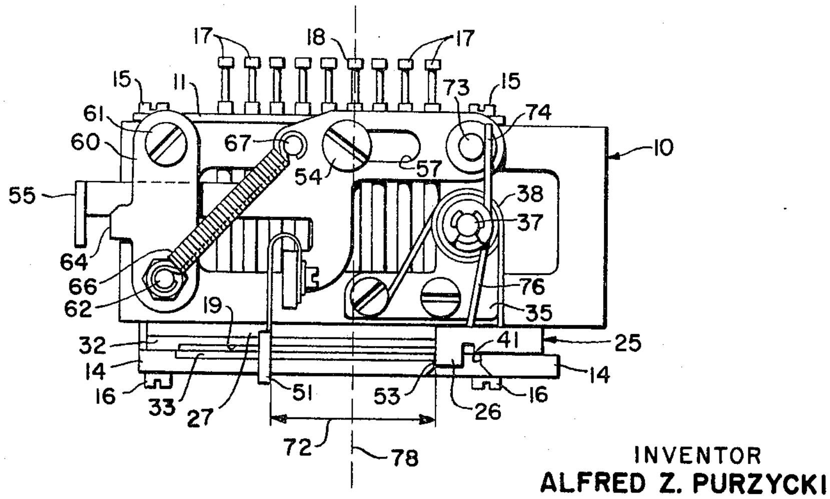
FIG. 3 is a front view of the device in its narrowest web guiding position.

As is seen in FIGS. 1, 2 and 3 the slidable guide support 50 is supported by a post 54 which is mounted in the frame 12. The post 54 is surrounded by an elongated hole 57 formed in the support 50 so that the slidable guide support 50 is both laterally slidable and rotatable with respect to the post 54. A leftwardly extending arm 55 (FIG. 1) on the support 50 has formed in its lower surface a plurality of sawtooth-shaped notches 56 which are used to position the slidable guide support 50 and thereby to position the second guide member 51. As is best seen in FIGS. 1 and 6 a positioning member 60 is attached to the frame 12 of the punch block 10 by a screw 61 and by a spring retaining bolt 62. The positioning member 60 is spaced from the frame 12 by a pair of spacers 63 and is held thereby in position to allow the leftwardly extending arm 55 to slide between the positioning member 60 and the frame 12 and to restrain the leftwardly extending arm 55 from rightward movement (FIG. 6) with respect to the frame 12. The positioning member 60 has a rearwardly extending arm 64 (leftwardly extending in FIG. 6) which has an upper edge 65 that is shaped to accommodate the notches 56 of the leftwardly extending arm 55. Thus, the notches 56 and the edge 65 cooperate to position the slidable guide support 50 with respect to the frame 12 of the punch block 10. A contractile spring 66 is attached to the spring retaining bolt 62 and to a post 67 on the slidable guide support 50. This spring urges the slidable guide support to move leftwardly (FIG. 1) with respect to the frame 12 and to rock counterclockwise (FIG. 1) about the post 54 thereby holding the notch 56 of the leftwardly extending arm 55 in engagement with the edge 65 of the rearwardly extending arm 64 on the positioning member 60.

In order to guide various widths of tape, these widths being represented by the lines 70, 71 and 72 in FIGS. 1, 2 and 3, respectively, the slidable guide support 50 is moved into the positions shown in FIGS. 1, 2 and 3 thereby varying the width of the web guiding channel. When the slidable guide support 50 is moved from the position shown in FIG. 1 to the position shown in FIG. 2, the second guide member 51 is moved to the right (FIGS. 1 and 2) and is thereby moved closer to the surface 53 of the first guide member 25 and to the feed hole punch pin 18. This operation does not, however, affect the positioning of the first guide member 25. Therefore, the width of web indicated by the line 71 differs from the widths of web indicated by the line 70 only in the difference between the distance from the left edge (FIGS. 1 and 2) of the web to the feed hole punch pin 18. That is, the width of web which lies between the feed hole punch pin 18 and the surface 53 of the first guide member 25 is not affected in any way. When the slidable guide support 50 is moved from the position shown in FIG. 2 to the position shown in FIG. 3, the width of web which lies between the second guide member 51 and the surface 53 of the first guide member 25 is again changed; however, in this instance both the distance between the second guide member 51 and the feed hole punch pin 18 and the distance between the feed hole punch pin 18 and the surface 53 of the first guide member 25 is altered. This is accomplished by moving the first guide member 25 out of engagement with the edge 41 of the slot 40 in the lower guide plate 14 and into engagement with the edge 42 of that slot.

As is best seen in FIGS. 2, 3 and 7 an outwardly extending post 73 is attached to the right-hand end (FIG. 2) of the slidable guide support 50. When the slidable guide support 50 is moved from the position shown in FIG. 2 to the position shown in FIG. 3 the post 73 engages an upwardly extending arm 74 of a bell crank 75 in the form of a relatively heavy spring and causes the bell crank 75 to rock about the reduced forward portion of the finger 37 of the bracket 35, a coil of the heavy spring serving to pivot the bell crank 75 on the finger 37. This in turn causes a downwardly extending arm 76 of the bell crank 75 to move to the left (FIGS. 2 and 3). This downwardly extending arm 76 is positioned in a hole 77 in the first guide member 25, and, therefore, the leftward movement of the downwardly extending arm 76 will drive the first guide member 25 to the left (FIG. 2) into engagement with the edge 42 of the slot 40 in the die plate 14. Since the bell crank 75 is a spring, the guide member 25 will be resiliently urged against the edge 42. As is best seen in FIG. 5, the first guide member 25 is guided in its movement by its edges 30 and 31 on its forward guiding leg 27 and rearward guiding leg 29, respectively, which edges are engaged with the sides of the lower guide plate 13. It should be noted that the positioning of the first guide member 25 after it has been moved to the left by the action of bell crank 75 is dependent upon the outwardly and downwardly extending leg 26 coming into engagement with the edge 42 of the die plate 14 and is not dependent upon the connecting portion 28 coming into engagement with the right-hand surface (FIG. 5) of the lower guide plate 13. This action allows the locating surfaces, that is, the edges 41 and 42 of the plate 14 to be readily accessible and easily cleaned.

As may be understood from the foregoing, the width of web represented by the line 71 in FIG. 2 differs from the width of web as represented by the line 72 in FIG. 3 in two ways. First, the web represented by the line 72 is of shorter width between the second guide member 51 and the feed hole punch pin 18. Secondly, the width of web of line 72 is shorter between the feed hole punch pin 18 and the surface 53 of the first guide member 25. This is necessary because the width of web represented by the line 72 is representative of that width of web which is used in five-level recording. In this type of recording two character punch pins 17 are employed to the right (FIG. 3) of the feed hole punch pin 18 and three character punch pins 17 are employed to the left (FIG. 3) of the feed hole punch pin 18. The width of web represented by the line 71 in FIG. 2 is used for six or seven level recording. In this case three character punch pins 17 are employed to the right (FIG. 2) of the feed hole punch pin 18 and either three or four character punch pins 17 are employed to the left of the feed hole punch pin 18. The width of web represented by the line 70 in FIG. 1 is used for eight level recording and in this case three character punch pins 17 are employed to the right (FIG. 1) of the feed hole punch 18 and five character punch pins 17 are employed to the left of the feed hole punch pin 18. Since it is necessary to employ three character punch pins to the right (FIGS. 1 and 2) of the feed hole punch pin 18 in six, seven and eight level recording the distance between the feed hole punch pin 18 and the surface 53 of the first guide member 25 must remain constant for the recording of these three levels. As has been pointed out, this is accomplished by causing the downwardly and outwardly extending arm 26 of the first guide member 25 to remain in engagement with the edge 41 of the guide plate 14 when the slidable guide support 50 is moved from the position shown in FIG. 1 to the position shown in FIG. 2. However, since five-level recording employs only two character punch pins 17 to the right (FIG. 3) of the feed hole punch pin 18 it is necessary to move the surface 53 of the first guide member 25 to the left (FIGS. 2 and 3) when it is desired to accomplish five-level recording. This is accomplished by moving the slidable guide support from the position shown in FIG. 2 to the position shown in FIG. 3 thereby causing the pin 73 on the slidable guide support 50 to engage and rock the bell crank 75. The rocking of the bell crank 75 causes the downwardly and outwardly extending leg 26 of the first guide member 25 to move out of engagement with the edge 41 and into engagement with the edge 42 of the die plate 14.

When it is desired to change the device so that it will guide a wider width of tape than is represented by the line 72 of FIG. 3, the leftwardly extending arm 55 of the slidable guide support 50 is raised and moved to the left. This will bring the pin 73 on the support 50 out of engagement with the bell crank 75 and will allow the spring 38 to drive the first guide member 25 out of engagement with the edge 42 of the lower guide plate 14 and into engagement with the edge 41 of that plate. The leftwardly extending arm 55 may then be positioned so as to bring one of the notches 56 into engagement with the edge 65 of the rearwardly extending arm 64 thereby bringing the web guiding channel to the proper width to guide the desired width of tape.

As a further illustration of the operation of the device a heavy dashed line 78 has been drawn in FIG. 3 to illustrate a plane through the device laying perpendicular to the plane of the drawing. It is about this plane that the sides of the tape guiding channels must be manipulated in order that tapes of different widths may be guided. Thus, when it is desired to change the device from its condition for guiding eight level tape to its condition for guiding six or seven level tape, the second guide member 51 is moved closer to the plane represented by the line 78 but the spacing of the surface 53 of the first guide member 25 with respect to that plane is not affected. Thus, the web guiding channel is not only made narrower but is made narrower in a special way so that the proportions of the web guiding channels will be correct. When it is desired to arrange the device for guiding five-level tape both the second guide member 51 and the surface 53 of the first guide member 25 are moved with respect to the plane represented by the line 78. Thus, once again the web guiding channel has not only been made narrower but has been made narrower in a special way so that it is properly proportioned with respect to the plane represented by the line 78.

Although only one embodiment of the invention is shown in the drawings and described in the foregoing specification, it will be understood that invention is not limited to the specific embodiment described, but is capable of modification and rearrangement and substitution of parts and elements without departing from the spirit of the invention. For example, the apparatus has been illustrated in connection with a web preparation device. It could, however, be employed in connection with a web utilization device with equal ease.

What is claimed is:

1. A guide mechanism for a web including:
a frame having at least two edges;
first guide means biased against one of the edges for defining one side of a tape guiding channel;
second guide means slidably mounted on said frame for cooperation with the frame and the first guide means to define said channel;
means for fixing the second guide means in at least two positions relative to the frame;
means for urging the first guide means away from said one edge of the frame and against the other edge to arrange the first guide means, the second guide means and the frame to define a second channel of narrower width, and
means mounted on the second guide means and normally disengaged from the urging means for engaging the urging means when the second guide means is moved from one of its positions to another of its positions and for driving the urging means and thereby moving the first guide means out of engagement with said one edge and into engagement with said other edge.

2. A guide mechanism for guiding webs of different widths including:
a frame having two locating surfaces and having a surface forming the bottom of a plurality of web guiding channels;
first guide means biased against one of the locating surfaces for forming one side of a first web guiding channel for a first width of web;
second guide means slidably mounted on the frame for forming the other side of the first web guiding channel;
means for fixing the second guide means in at least two positions relative to said frame;
driving means mounted on the second guide means for moving the first guide means into engagement with the other of said locating surfaces on the frame; and
means engaged and driven by the driving means when the second guide means is moved relative to the frame for moving the first guide means out of engagement with said one of the locating surfaces and into engagement with the other of the locating surfaces to position the first guide means and the second guide means with respect to the frame to define a second web guiding channel of different width from the first web guiding channel.

3. A mechanism for guiding webs including:
a frame having two opposed locating surfaces and having a surface for defining the bottom of web guiding channel;
a first web guide slidably mounted in the frame;
a spring for holding the first web guide against one of the locating surfaces thereby positioning it to guide webs of first and second predetermined widths;
a second web guide slidably mounted on the frame;
a latch for holding the second web guide in three positions thereby positioning it to guide webs of first, second and third predetermined widths, and
means normally disengaged from the second web guide and engageable thereby when it is moved from its second position to its third position for moving the first web guide out of engagement with said one of the locating surfaces and into engagement with the other of the locating surfaces thereby positioning it to guide webs of a third predetermined width.

4. A web guiding device for use in conjunction with a web utilization device which has a reference plane for alignment with a predetermined area of a web including:
a frame having two locating surfaces and having a surface for defining the bottom of a web guiding channel;
first guide means spring urged into engagement with one of the locating surfaces for determining the distance from the reference plane to one edge of the web;
second guide means for determining the distance from the reference plane to the other side of the web;
means for moving the second guide means into at least two positions relative to the reference plane of the tape utilization device;

means for holding the second guide means in said positions;

driving means mounted on the moving means, and means normally disengaged from the driving means and engaged thereby when the second guide means is moved from one of said positions to another for moving the first guide means out of engagement with said one of the locating surfaces and into engagement with other of the locating surfaces thereby locating the first guide means in a different position with respect to the reference plane.

5. A web guiding device for use in conjunction with a web utilization device which has a reference plane for alignment with a predetermined area of a web including:

a frame having two locating surfaces and having a surface for defining the bottom of a web guiding channel;

a first guide means spring urged into engagement with one of the locating surfaces for determining the distance from the reference plane to one edge of the web;

a second guide means for determining the distance from the reference plane to the other side of the web;

means for holding the second guiding means in at least two positions relative to the reference plane of the tape utilization device, and a spring type lever mounted on the frame, normally disengaged from the second guide means and engageable by the second guide means to drive the first guide means out of engagement with said one of the locating surfaces and into engagement with the other of the locating surfaces thereby positioning the first guide means in a different position with respect to the reference plane.

6. A guide mechanism for a web including:

a frame;

a first plate attached to the frame and having two locating edges;

a second plate interposed betwen the frame and the first plate;

a first guide of generally U-shaped configuration surrounding and in frictional engagement with the second plate and having an outwardly and downwardly extending arm which is biased against one of the locating edges on the second plate;

a second guide slidably mounted on the frame;

latching means for fixing the second guide in any one of a plurality of positions relative to the frame, and lever means engabeable by the second guide for urging the first guide out of engagement with said one of the locating edges on the first plate and into engagement with the other of the locating edges on the first plate, the latching means and the lever means also for positioning the first guide and the second guide in any one of a plurality of combinations of positions whereby webs of different widths may be guided between them.

7. A guide mechanism for a web including:

a frame;

a first plate attached to the frame and having two locating surfaces;

a second plate interposed between the frame and the first plate;

a first guide of generally U-shaped configuration slidably surrounding the second plate and having an outwardly and downwardly extending arm which is biased against one of the locating surfaces on the first plate;

a guide support member slidably mounted on the frame;

a second guide mounted on the guide support member;

latching means for fixing the guide support member in any one of a plurality of positions relative to the frame, and a spring type lever mounted on the frame and engageable by the guide support member for urging the first guide out of engagement with said one locating surface on the first plate and into engagement with the other locating surface on the second plate, the latching means and the spring type lever serving to position the first guide and second guide in a plurality of combinations of positions with respect to the first plate whereby webs of various widths may be guided between them.

8. A device for guiding strips of webs into an operative relationship with a plurality of web engaging members, including a generally centrally located web engaging member which is associated with feed holes in the web, comprising:

a frame having two locating surfaces;

a first web guide slidably mounted on the frame and having an arm biased into engagement with one of the locating surfaces on the frame to position the first web guide a first predetermined distance from the web engaging member associated with feed holes in the web thereby presenting a first predetermined width of web to a first predetermined number of web engaging members between the web engaging member associated with feed holes in the web and the first web guide;

a second web guide slidably mounted on the frame;

latching means for holding the second web guide in any one of a plurality of positions with respect to the web engaging member associated with feed holes in the web, said lacthing means holding the second web guide in a first position to present a second predetermined width of web to a second predetermined number of web engaging members between the second web guide and the web engaging member associated with feed holes in the web and holding the second web guide in a second position to present a third predetermined width of web to a third predetermined number of web engaging members between the second web guide and the web engaging member which is associated with feed holes in the web; and means engaged by the second web guide when it is moved from said first position to said second position for driving the arm on the first web guide out of engagement with one of the locating surfaces on the frame and into engagement with the other of the locating surfaces on the frame thereby positioning the first web guide with respect to the web engaging member associated with feed holes in the web to present a fourth predetermined width of web to a fourth predetermined number of web engaging members between the web engaging member associaed with feed holes in the web and the first web guide.

9. A device for guiding strips of tapes into operative relationship with a plurality of punch pins including a generally centrally displaced feed hole punch pin comprising:

a frame having two locating surfaces;

a first tape guide slidably mounted on the frame and having an outwardly and downwardly extending arm;

a spring for biasing the outwardly and downwardly extending arm of the first tape guide against one of the locating edges on the die plate thereby positioning the first tape guide in a first predetermined position with respect to the feed hole punch pin to present a first predetermined width of tape to three punch pins between the feed hole punch pin and the first tape guide;

a second tape guide slidably mounted on the frame;

latching means for fixing the second tape guide in three predetermined positions with respect to the feed hole punch pin, the first of these positions locating the second tape guide to present a second predetermined width of tape to five punch pins between the second tape guide and the feed hole punch pin, the second of these positions locating the second tape guide to present a third predetermined width of tape to four punch pins between the second tape guide and the feed hole punch pin and the third of these positions locating the second tape guide to present a fourth predetermined width of tape to three punch pins between the second tape guide and the feed hole punch pin, and a spring type bell crank mounted on the frame, normally disengaged from the second tape guide and engageable by the second tape guide when the guide is moved from its second position to its third position for driving the outwardly and downwardly extending arm of the first tape guide out of engagement with said one of the locating edges on the die plate and into engagement with the other of the locating edges on the die plate thereby positioning the first tape guide in a second predetermined position with respect to the feed hole punch pin to present a fifth predetermined width of tape to two punch pins between the feed hole punch pin and the first tape guide.

10. A device for guiding strips of tape into an operative relationship with a plurality of punch pins, including a generally centrally displaced feed hole punch pin, comprising:

a frame;

a die plate attached to the frame and having two locating edges;

a guide plate interposed between the die plate and the frame and fixed thereto;

a first tape guide having a generally U-shaped configuration which surrounds the guide plate on three sides and having an outwardly and downwardly extending arm;

a spring for biasing the outwardly and downwardly extending arm of the first tape guide against one of the locating edges on the die plate thereby positioning the first tape guide in a first predetermined position with respect to the feed hole punch pin to present a first predetermined width of tape to three punch pins between the feed hole punch pin and the first tape guide:

a guide support member slidably mounted on the frame;

a second tape guide yieldably mounted on the guide support member;

latching means for fixing the guide support member and therefore the second tape guide in three predetermined positions with respect to the feed hole punch pin, the first of these positions locating the guide support member to present a second predetermined width of tape to five punch pins between the second tape guide and the feed hole punch pin, the second of these positions locating the guide support member to present a third predetermined width of tape to four punch pins between the second tape guide and the feed hole punch pin and the third of these punch pin positions locating the guide support member to present a fourth predetermined width of tape to three punch pins between the second tape guide and the feed hole punch pin;

a post on the guide support member, and a spring type bell crank mounted on the frame, normally disengaged from the post on the guide support member and engageable by the post when the guide support member is moved from its second position to its third position for driving the outwardly and downwardly extending arm of the first tape guide out of engagement with said one of the locating edges on the die plate and into engagement with the other of the locating edges on the die plate thereby positioning the first tape guide in a second predetermined position with respect to the feed hole punch pin to present a fifth predetermined width of tape to two punch pins between the feed hole punch pin and the first tape guide.

References Cited by the Examiner

UNITED STATES PATENTS 3,035,471 5/1962 De Boo ------------- 83—449

WILLIAM S. LAWSON, *Primary Examiner.*